United States Patent
Rabb et al.

(10) Patent No.: US 9,734,702 B2
(45) Date of Patent: Aug. 15, 2017

(54) METHOD AND SYSTEM FOR CONSOLIDATING EVENTS ACROSS SENSORS

(71) Applicant: Google Inc., Mountain View, CA (US)

(72) Inventors: Laura Rabb, San Jose, CA (US); Yash Modi, San Mateo, CA (US); Timo Bruck, Mountain View, CA (US); Greg Fulco, San Francisco, CA (US); Kenneth Louis Herman, San Jose, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 14/718,291

(22) Filed: May 21, 2015

(65) Prior Publication Data

US 2016/0343243 A1    Nov. 24, 2016

(51) Int. Cl.
| | |
|---|---|
| *G08B 13/08* | (2006.01) |
| *G08B 29/18* | (2006.01) |
| *G08B 25/00* | (2006.01) |
| *H04L 29/06* | (2006.01) |
| *H04L 29/08* | (2006.01) |
| *H04L 12/28* | (2006.01) |

(52) U.S. Cl.
CPC ......... *G08B 29/185* (2013.01); *G08B 25/002* (2013.01); *G08B 29/188* (2013.01); *H04L 12/2823* (2013.01); *H04L 67/26* (2013.01); *H04L 69/26* (2013.01)

(58) Field of Classification Search
CPC  G08B 13/2494; G08B 25/002; G08B 29/188; G08B 29/185
USPC ..................................... 340/545.3, 541, 522
See application file for complete search history.

(56) References Cited

U.S. PATENT DOCUMENTS

| | | | | |
|---|---|---|---|---|
| 4,882,567 | A * | 11/1989 | Johnson ............. | G08B 13/2494 340/522 |
| 6,992,577 | B2 * | 1/2006 | Tsuji .................. | G08B 13/2494 340/545.3 |
| 7,242,295 | B1 | 7/2007 | Milinusic et al. | |
| 8,098,156 | B2 | 1/2012 | Caler et al. | |
| 2003/0067386 | A1 | 4/2003 | Skinner et al. | |

(Continued)

FOREIGN PATENT DOCUMENTS

WO    2011085112 A1    7/2011

OTHER PUBLICATIONS

Extended European Search Report for Application No. 16169942.6, dated Jul. 28, 2016.

*Primary Examiner* — John A Tweel, Jr.
(74) *Attorney, Agent, or Firm* — Morris & Kamlay LLP

(57) ABSTRACT

A method may receive, in response to a first event, a first sensor data from a first sensor, and receive, in response to the first event, a second sensor data from a second sensor. The method may select, from among a plurality of event profiles, a first event profile. The first event profile may comprise a first condition matching the first sensor data, a second condition matching the second sensor data, and a plurality of conditions which, when met, indicate the occurrence of the first event. Conditions may include a sensor data, a time period, a user data, a sequence of conditions, or a combination of such data. The first event profile may comprise a first event notice to be provided in response to the occurrence of the first event. The method may provide the first event notice to a recipient indicated by the event profile.

22 Claims, 14 Drawing Sheets

(56) References Cited

U.S. PATENT DOCUMENTS

| | | |
|---|---|---|
| 2007/0262857 A1 | 11/2007 | Jackson et al. |
| 2008/0252448 A1 | 10/2008 | Agarwalla et al. |
| 2008/0317286 A1 | 12/2008 | Thorpe et al. |
| 2009/0002157 A1 | 1/2009 | Donovan et al. |
| 2009/0027196 A1 | 1/2009 | Schoettle et al. |
| 2011/0169637 A1* | 7/2011 | Siegler, II .......... G08B 13/2494 340/541 |
| 2011/0252132 A1 | 10/2011 | Wetzer et al. |
| 2012/0166469 A1 | 6/2012 | Cammert et al. |
| 2014/0266670 A1 | 9/2014 | Krishnamoorthy et al. |
| 2014/0266699 A1 | 9/2014 | Poder et al. |
| 2014/0313032 A1 | 10/2014 | Sager et al. |
| 2014/0368643 A1 | 12/2014 | Siegel et al. |
| 2015/0052578 A1 | 2/2015 | Yau et al. |

\* cited by examiner

METHOD AND SYSTEM FOR CONSOLIDATING EVENTS ACROSS SENSORS

BACKGROUND

Certain premises management systems, such as security systems, may employ multiple sensors throughout a premises. In some circumstances a single event may register as multiple events across multiple sensors. For example a door open/close sensor may detect a door opening and register a first event, and a motion sensor in a front hallway may also detect the motion of the door opening and register a second event. The detection of the door opening by the open/close sensor may trigger a first alert notice. The detection of the motion of the door opening by the motion sensor may also trigger a second alert notice, even though the door opening is the cause of both sensor detections. In other circumstances a single sensor may be triggered when it is not desirable to detect an event. For example a bus may pass by the front of a house and trigger a motion sensor through the window in a front room.

BRIEF SUMMARY

According to an embodiment of the disclosed subject matter, a method may receive, in response to a first event, a first sensor data from a first sensor, at a first location, and at a first time; and receive, in response to the first event, a second sensor data from a second sensor, at a second location, and at a second time. The method may select, from among a plurality of event profiles, a first event profile. The first event profile may comprise a first condition matching the first sensor data, a second condition matching the second sensor data, and a plurality of conditions which, when met, indicate the occurrence of the first event. The first event profile may comprise a first event notice to be provided in response to the occurrence of the first event. The method may provide the first event notice to a recipient indicated by the event profile.

According to another embodiment of the disclosed subject matter, a system may include a database storing a plurality of event profiles. Each event profile of the plurality of event profiles may include a plurality of conditions which, when met, indicate the occurrence of an event defined by the event profile, and an event notice to be provided in response to the occurrence of an event. The system may include a first sensor, a second sensor, and a processor. The processor may be in communication with the database, the first sensor, and the second sensor. The processor may be configured to execute instructions for: receiving, in response to a first event, a first sensor data from the first sensor, at a first location, at a first time; receiving, in response to the first event, a second sensor data from the second sensor, at a second location, at a second time; and selecting, from among the plurality of event profiles, a first event profile. The first event profile may include: a first condition matching the first sensor data, a second condition matching the second sensor data, a plurality of conditions which, when met, indicate the occurrence of the first event, and a first event notice to be provided in response to the occurrence of the first event. The processor may be configured to execute instructions for providing the first event notice to a recipient indicated by the event profile.

According to an embodiment of the disclosed subject matter, a method may receive, in response to a first event, a first sensor data from a first sensor at a first location at a first time; and receive, in response to the first event, a second sensor data from a second sensor at a second location at a second time. The method may select, from among a plurality of event profiles, a first event profile. The first event profile may comprise a first condition matching the first sensor data, a second condition matching the second sensor data, a plurality of conditions which, when met, indicate the occurrence of the first event, and a first event notice to be provided in response to the occurrence of the first event. The method may provide the first event notice to a recipient indicated by the event profile. The method may receive an event notice request from the recipient and select, from among the plurality of event profiles, a second event profile. The second event profile may comprise the first condition matching the first sensor data, the second condition matching the second sensor data, and a third condition matching the received event notice request. The second event profile may comprise a plurality of conditions which, when met, indicate the occurrence of the second event, and a second event notice to be provided in response to the occurrence of the second event. The method may provide the second event notice to the recipient.

According to another embodiment of the disclosed subject matter, a means for receiving, in response to a first event, a first sensor data from a first sensor, at a first location, at a first time; receiving in response to the first event, a second sensor data from a second sensor, at a second location, at a second time; and selecting, from among a plurality of event profiles, a first event profile. The first event profile may include a first condition matching the first sensor data, a second condition matching the second sensor data, a plurality of conditions which, when met, indicate the occurrence of the first event, and a first event notice to be provided in response to the occurrence of the first event. Further disclosed are a means for providing the first event notice to a recipient indicated by the event profile.

Additional features, advantages, and embodiments of the disclosed subject matter may be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide further understanding of the disclosed subject matter, are incorporated in and constitute a part of this specification. The drawings also illustrate embodiments of the disclosed subject matter, and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

To address the issues previously described, devices, systems, and techniques as disclosed herein may provide for consolidation of events across sensors by comparing captured sensor data to stored event profiles. For example, an event may be represented by an event profile, and the event profile may comprise an event notice. Sensors may collect data from a series of events within certain time periods such that the collected sensor data and time periods make up an event sequence. This event sequence may be compared to an event sequence stored in the event profile. If the event sequence and the event profile match, then a single notice may be sent to a device associated with a user. In this way multiple events may be consolidated into a larger single event and only a single event notice may be sent.

Embodiments disclosed herein may be implemented in various premises management systems such as security systems, temperature control systems, hazardous substance detection systems, and other premises management systems, such as those that incorporate intelligent, multi-sensing, network-connected devices, which can integrate seamlessly with each other and/or with a central server or cloud-computing system. Embodiments disclosed herein may be partially or completely incorporated within a "smart home environment" as described in later portions of this disclosure.

Figure 1:
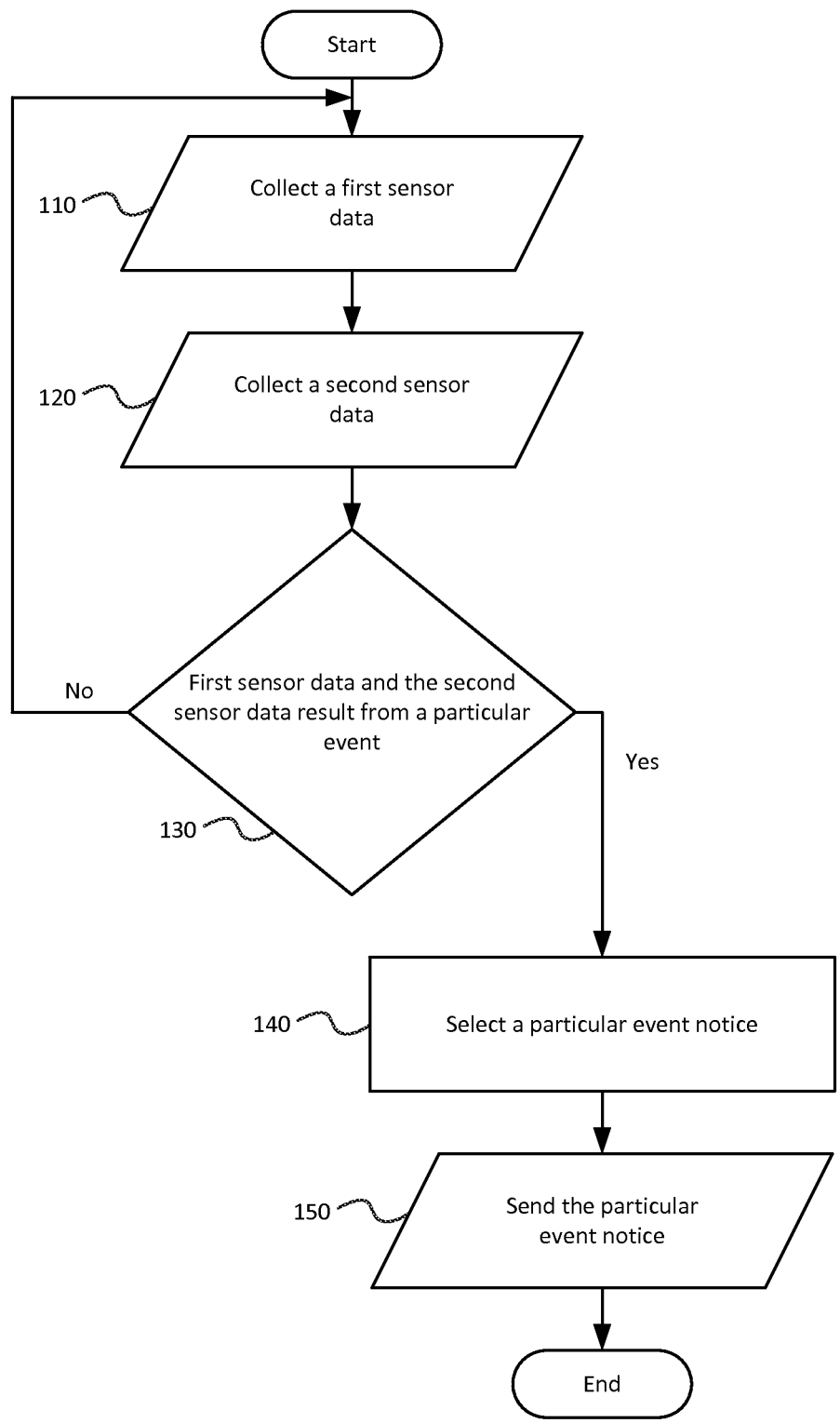
FIG. 1 shows a method according to an embodiment of the disclosed subject matter.

FIG. 1 shows a method 100 according to an embodiment of the disclosed subject matter. At 110, a first sensor may collect a first sensor data and at 120 a second sensor may collect a second sensor data. These sensors may be any sensors suitable for a premises management system, such as an open/close sensor, a locked/unlocked sensor, a hazard detection sensor, a door knob sensor, a weight sensor, a motion sensor, an occupancy sensor, and an entry detector sensor, as well as any suitable sensor described in later portions of this disclosure in connection with a smart home environment. For example, the sensor at 110 may be a door open/close sensor that collects data indicating a door is open or closed, and the sensor at 120 may be an imaging sensor that collects imaging data.

At 130 the method may determine whether the collected first sensor data and the collected second sensor data result from a particular event. In an example, the first sensor data and second sensor data may both be conditions of a particular event profile representative of a particular event. The particular event profile may contain a condition that the first sensor data and second sensor data both be collected. A plurality of event profiles representative of different events may be queried. Based on a match between the collected sensor data and the condition of the particular event profile, the first sensor data and the second sensor data may be determined to result from the particular event represented by the particular event profile. The method may return an indication that the particular event has occurred, or the matched event profile may serve as a basis for other functions of the subject matter of this disclosure. The determination that collected data results from a particular event may be equivalent to a determination that the collected data satisfies the conditions of a particular event profile. Additional methods for determining whether collected sensor data and other data results from a particular event are discussed throughout this disclosure.

At 140 the method may select a particular event notice. The particular event notice may be selected by a range of methods suitable for the subject matter of this disclosure. For example, particular event profile may comprise the particular event notice or be linked or otherwise associated with the particular event notice. The notice may include any transmission that communicates with, or establishes the ability to communicate with, a person or entity. For example the notice may be a text message or graphical indicator on a user device, a signal sent to an alarm system, an audio, image, video, or tactile indicator, streaming data such as a video stream, or other notice format suitable for the subject matter of this disclosure.

At 150 the method may send the particular event notice. The particular event notice may be provided to a recipient indicated by the event profile. A recipient may be indicated by an event profile if a system of the smart home environment in communication with the subject matter of this disclosure, such as a premises monitoring system, defines the recipient "globally" across the system. A recipient may also be specifically defined for each event profile or a set of event profiles.

A notice may be sent to a device associated with a user such as a user's mobile device, or to any other system or device suitable for the subject matter of this disclosure. For example, the particular event notice may be sent to other systems of a premises management system, an external server, the police, or a home monitoring system provided by a third party service provider. Method 100 depicts the collection of two sensor data, but additional combinations of sensors, sensor data, sequences of sensor data, and other data may also be received, collected, and analyzed.

Figure 2:
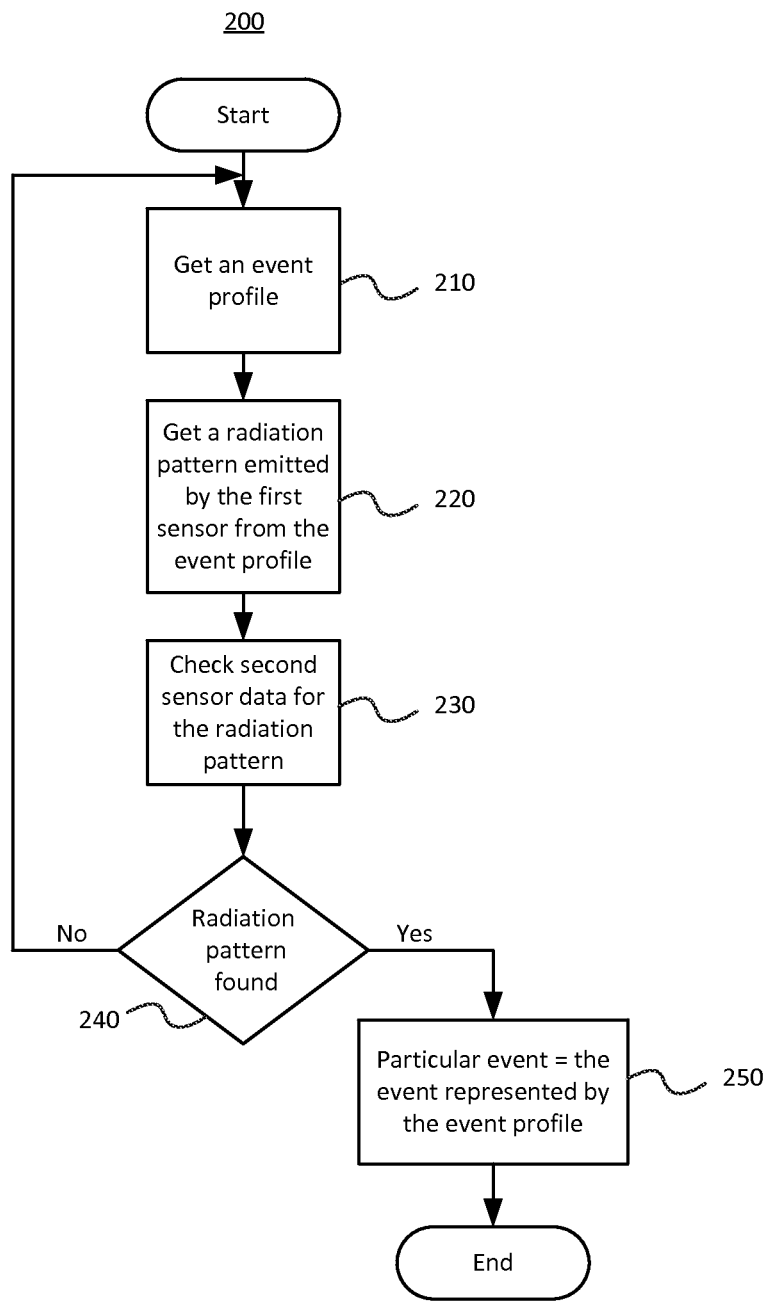
FIG. 2 shows a method according to an embodiment of the disclosed subject matter.

Various methods may be employed to determine at 130 whether the collected first sensor data and collected second sensor data result from a particular event based on an event profile. For example FIG. 2 shows a method according to an embodiment for determining whether sensor data results from a particular event based on an event profile, where the event profile may have a condition of a determination that an effect of the first sensor data is present within the second sensor data. For example, the first sensor may be an active infrared sensor that includes an active infrared emission component and optionally an image capture component, which may emit an infrared radiation pattern on a front door. When the front door opens the first sensor may collect variations in the reflection of the infrared radiation pattern and thereby detect the door is moving. The second sensor may be an imaging sensor configured to collect imaging data and detect certain events in the imaging data. The second sensor may capture imaging data of the door moving and thereby also detect the door is moving. The second sensor may also detect and capture the infrared radiation pattern emitted by the first sensor.

At 210 the method may access an event profile that has a condition of a determination that the radiation pattern of the first sensor data is present within the second sensor data. At 220 the method may obtain the radiation pattern from the event profile, and at 230 the method may analyze the second sensor data for the radiation pattern. At 240, if the radiation pattern is found in the second sensor data, the method may determine the first sensor data and the second sensor data result from the event represented by the event profile, and at 250 the particular event determined by the method may be set as the event represented by the event profile.

Figure 3:
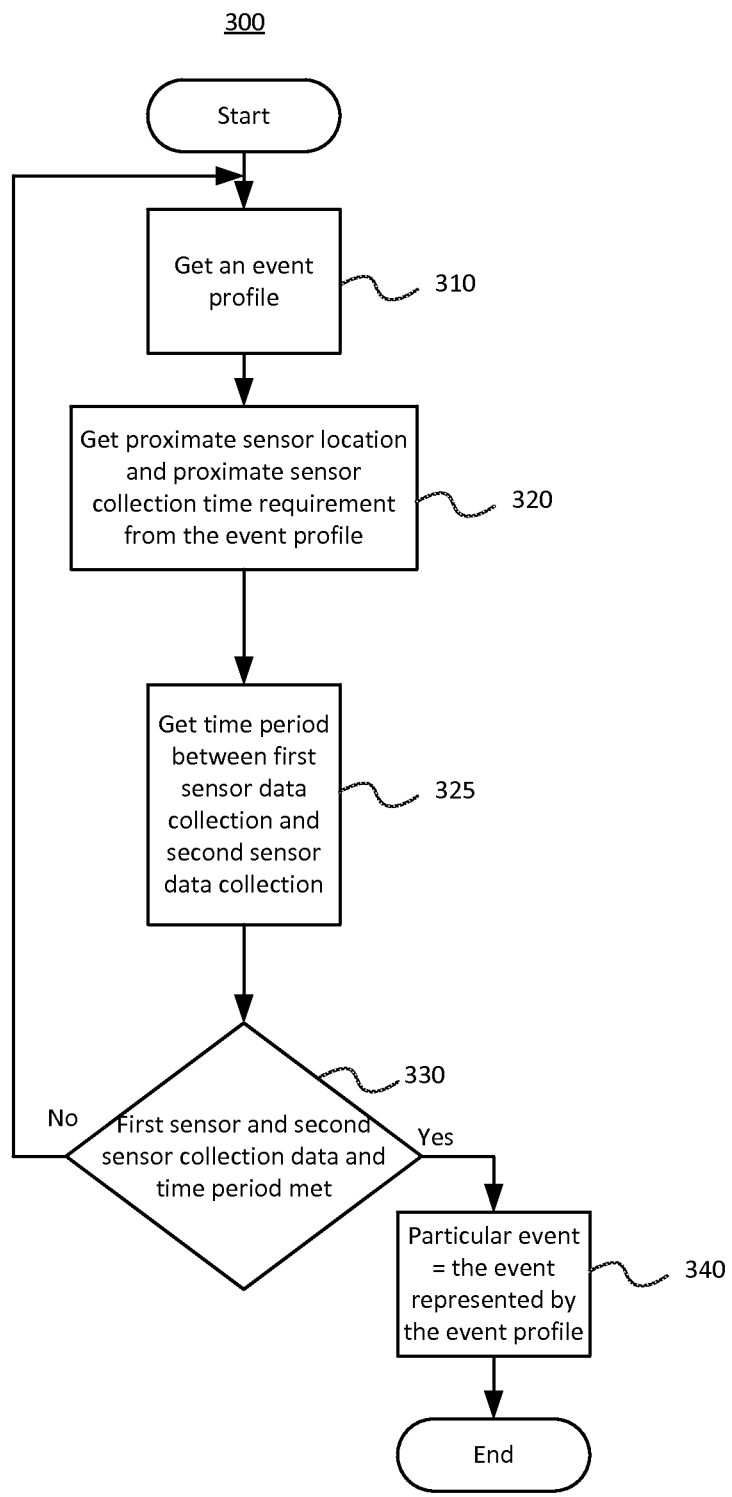
FIG. 3 shows a method according to an embodiment of the disclosed subject matter.

FIG. 3 shows another method 300 according to an embodiment to determine whether the collected first sensor data and collected second sensor data result from a particular event. In an example, an event profile may contain conditions that are satisfied if the locations of two sensors are determined to be the same or proximate within a location threshold or if the monitoring areas of two sensors are the same or overlap. Additional conditions may include determining the collection time of a first sensor is the same or proximate to a collection time of a second sensor, or if sensors that are configured to collect from proximate locations both collect sensor data at proximate times. For example, a motion sensor in front of a door may be triggered when a person steps on the front porch and an imaging sensor above the door may also be triggered within 5 seconds of the motion sensor. This combination of sensor data may meet the conditions of a particular event profile for a premises that requires that the motion sensor and the imaging sensor are trigged within 10 seconds of one another and configured to collect from the front porch. Such an event profile may be representative of the event of a person being at the front door of the premises.

As shown in FIG. 3, the method may access the particular event profile at 310 and obtain the conditions at 320. The method may obtain a time period between the collection of the first sensor data and the second sensor data at 325. The method may determine the time period between the collection of the first sensor data and the second sensor data by, for example subtracting the time of collection of the first sensor data from the time of collection of the second sensor data. If, at 330, the collected first sensor data, collected second sensor data, and the time period match the specified values of the conditions, then at 340 the particular event may be determined to be the event represented by the particular event profile. The method may then send a notice to the device of an occupant of the premises indicating a person is at the front door.

Figure 4:
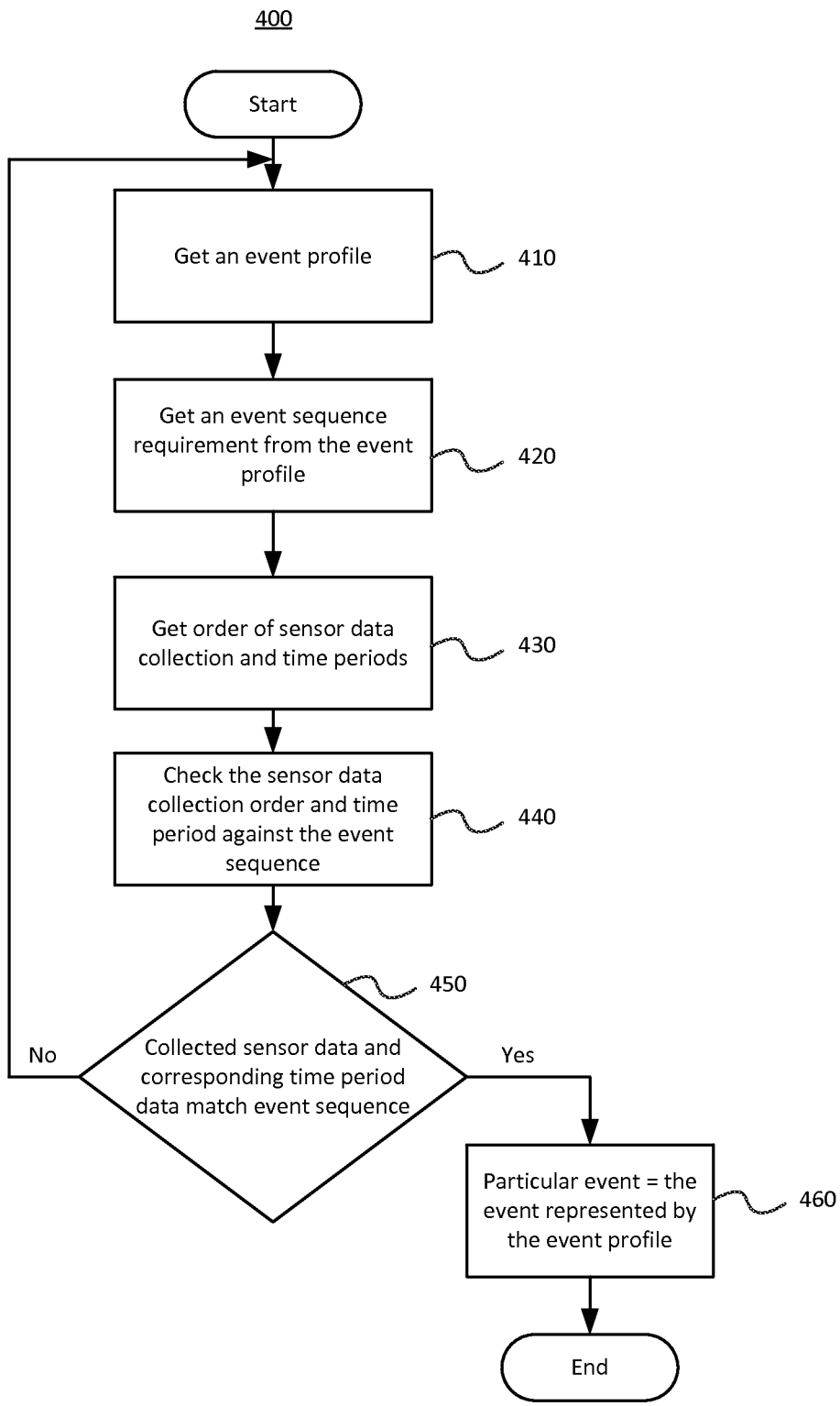
FIG. 4 shows a method according to an embodiment of the disclosed subject matter.

In addition to event profiles based on proximate sensor locations and proximate sensor data collection times, event profiles may be based on sequences of conditions. FIG. 4 shows a method 400 according to an embodiment that may determine whether the collected first sensor data and collected second sensor data result from a particular event, based on an event sequence. Event sequences may be sequences of sensor data or other events, times before or after which data may be collected, or time periods within which data may be collected.

In an example, method 400 may obtain an event profile at 410 and obtain an event sequence condition from the event profile at 420. The event sequence condition may specify a series of conditions, for example, collecting motion sensor data from a motion sensor at a front hallway of a premises, a time period of 5 seconds, collecting door unlocked data from a door lock/unlock sensor at a front door, at a time period of 5 seconds, collecting door open data from a door open/close sensor at the front door, a time period of 15 seconds, collecting door closed data from the door open/close sensor at the front door, and a final time period of 15 minutes. The event profile containing the condition of this event sequence may be representative of an event of leaving the premises and forgetting to lock the front door.

At 430 the order in which sensor data was collected may be obtained, sensor data collection times may be obtained, and the time periods between the collection of sensor data may be determined. The method may then check the sensor data collection order and time periods against the event sequence conditions at 440. At 450 if the collected sensor data order and time periods match the event sequence conditions, then at 460 the particular event may be determined to be the event represented by the event profile containing the event sequence. This may result in the method sending a notice to a device associated with an occupant of the premises that he or she has left the premises without locking the front door.

Figure 5:
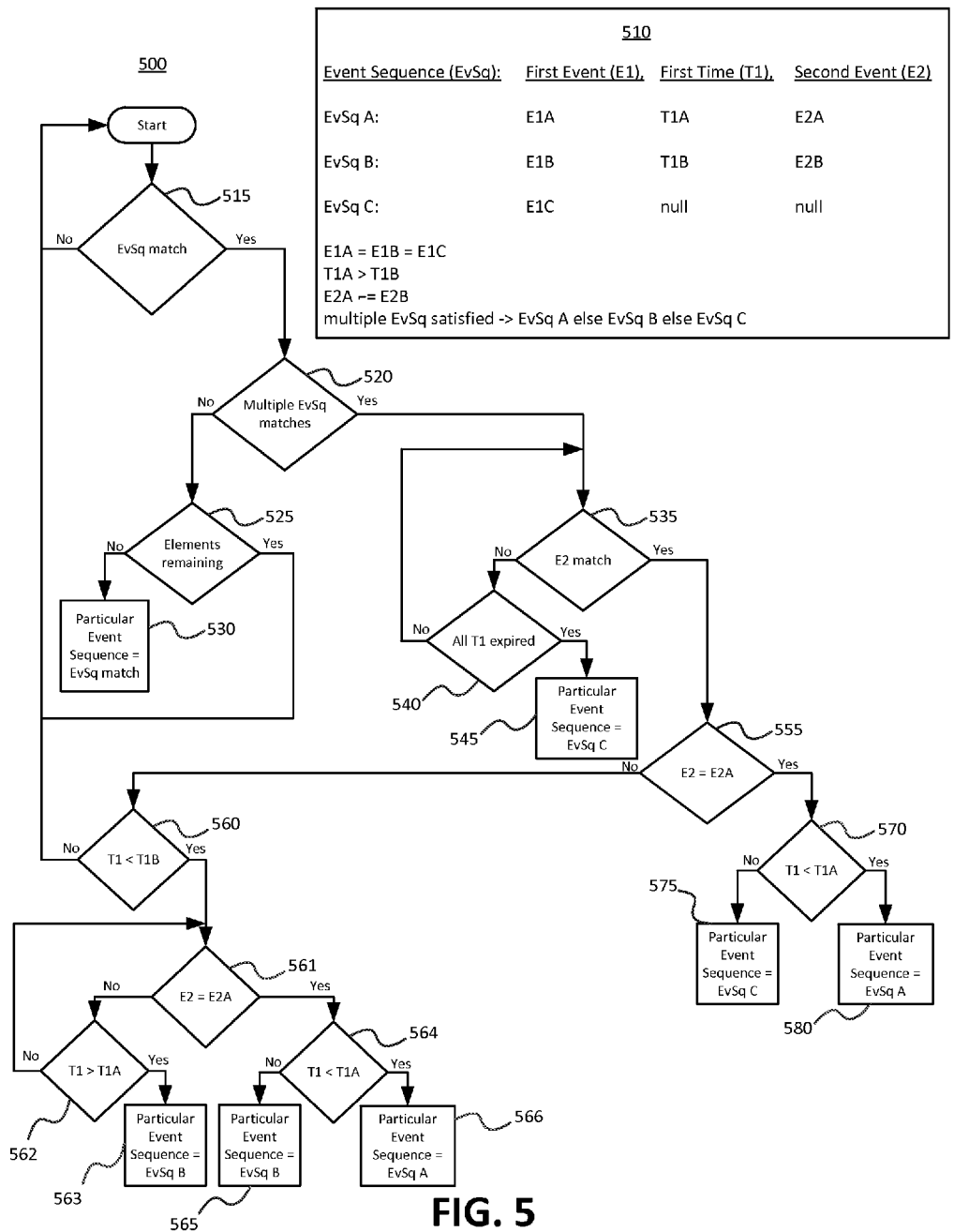
FIG. 5 shows a method according to an embodiment of the disclosed subject matter.

In some circumstances, at a given time, collected sensor data may be consistent with multiple event sequences across multiple event profiles. In an example, FIG. 5 shows a method 500 according to an embodiment for determining amongst multiple consistent event sequences. Table 510 may contain event sequence A (EvSq A), event sequence B (EvSq B), and event sequence C (EvSq C). Each event sequence may contain a first event condition (E1), a first time period condition (T1), and second event condition (E2). The event conditions may be based on the collection of a sensor data. EvSq A may be made up of E1A, T1A, and E2A, and EvSq B may be made up of E1B, T1B, and E2B. EvSq C may be made up of E1C and may not have a value for T1 or E2. Table 500 may also specify that if the conditions of two or more event sequences are fully satisfied, then the event sequence may be determined in accordance with the priority of EvSq A first, EvSq B second, and EvSq C third.

In general, method 500 may determine whether each event condition in table 510 is met and then determine whether such conditions are met within the specified time period conditions. Once all potential time period conditions have expired, the method may select any fully satisfied event sequences based on the priority rule.

E1A, E1B, and E1C may each be the same type of sensor data from the same sensor at a premises. For example E1A, E1B, and E1C may each be sensor data from a door open/close sensor indicating the front door is open. T1A may be longer than T1B, for example T1A may be 45 seconds and T1B may be 30 seconds. E2A may be a different event from E2B. For example E2A may be data from an active infrared sensor that recognizes variations in a reflected pattern of radiation as indicative of an authorized user of the premises, whereas E2B may be data from an imaging sensor that indicates non-recognition of a person at the premises.

The method may determine there is an event sequence match at 515. This may be that E1 matches the sensor data collected by a sensor at the premises. At 520 the method may determine whether the collected sensor data matches multiple event sequences. For example, if E1A is collected, then E1B and E1C would also be collected in accordance with table 510. If time period (T1) is less than T1A and T1B, then EvSq A, EvSq B, and EvSq C may each match. Alternatively, if only one event sequence is matched, then at 525, the method may determine whether the matched event sequence has further conditions that may be fulfilled in the future. For example, if E1A, E1B, and E1C are collected but T1 is greater than T1A and T1B, then only EvSq C may be matched and thus at 530 the particular event maybe determined to be the event represented by EvSq C. Alternatively, if there are conditions remaining in the matched EvSq, then the method may restart the query at 515 to determine if there is a further event sequence match.

If at 520 there are multiple event sequence matches, then at 535 the method may determine whether E2 was matched by collected sensor data. If there is not an E2 match, then the method may determine whether all the T1 conditions have expired at 540. If all remaining T1 conditions have expired, then at 545 the method may determine the particular event is the event represented by EvSq C because there is no possibility of further match within a T1 of either EvSq A or EvSq B. If all remaining T1 have not yet expired, then the method may restart the query at 535 to determine if there is an E2 match.

The method may determine there is an E2 match at 535, at which point the method may obtain the condition of the E2 match and determine whether E2 is E2A at 555. If the method compares the collected sensor data E2 to E2A and determines E2 is not E2A, then the method may compare T1 to T1B to determine if time period is less than T1B at 560. If T1 is less than T1B, then the method may again determine whether E2 is E2A at 561. If the method determines there is still not an E2A for E2, then at 562 the method may determine whether T1A is expired. If T1A is expired, then the method may determine that the particular event sequence is EvSq B at 563 because the conditions of EvSq B are met and T1 of EvSq A may no longer be satisfied. If T1A is not expired, then the method may repeat. If at 561 E2 is determined to have a value E2A, then the method may determine whether T1A is expired at 563. If T1A is not expired then the method may determine that the particular event sequence is EvSq B at 565, otherwise the method may determine the particular event sequence to be EvSq A at 566.

Alternatively at 555, the method may determine E2 is E2A and then query whether T1 is less than T1A at 570. If T1 is greater than T1A, then the method may determine that the particular event sequence is EvSq C at 575 because only E2A was determined, and T1A is longer than T1B. Alternatively, if at 570 the method determines that T1 is less than T1A then the method may determine that the particular event sequence is EvSq A at 580 because all conditions of EvSq A are satisfied.

Figure 6:
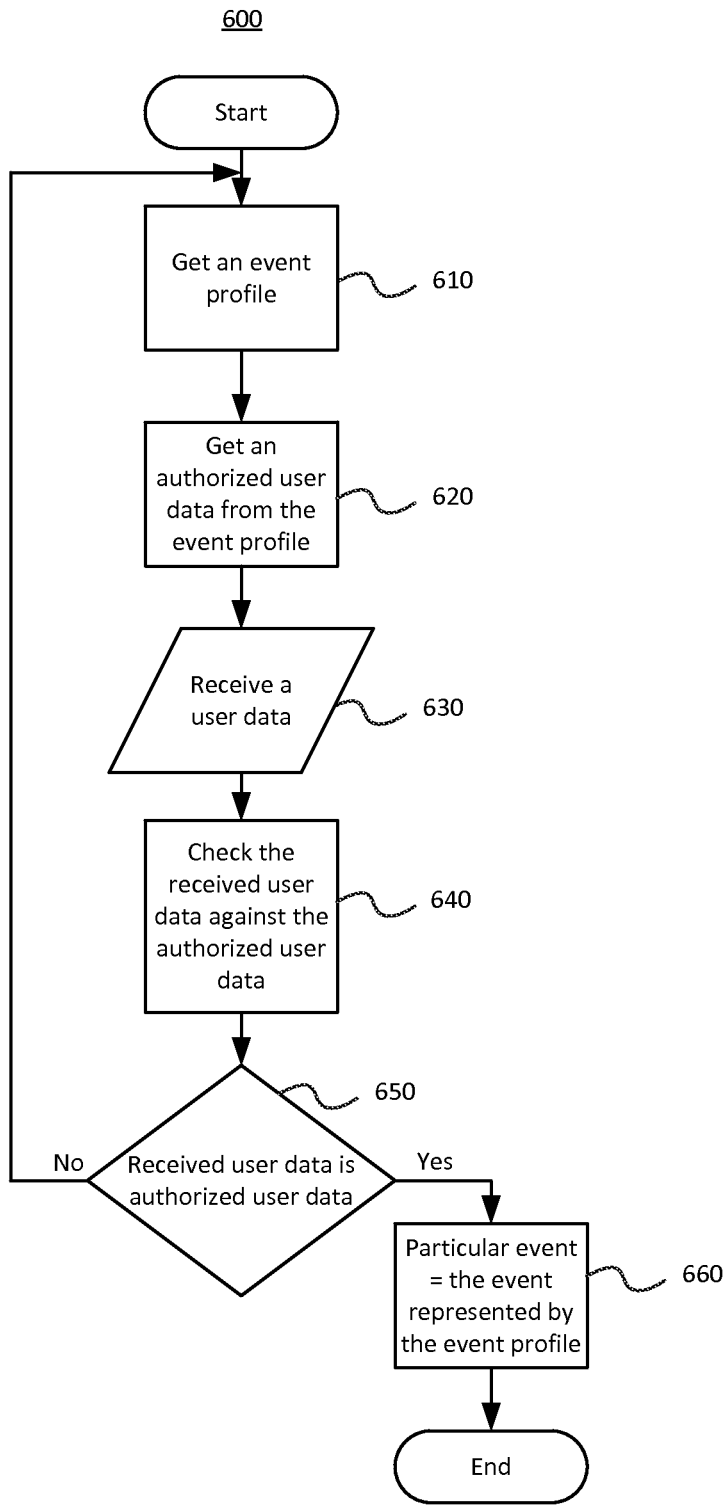
FIG. 6 shows a method according to an embodiment of the disclosed subject matter.

In addition to sensor data, user data may be received and used to determine a particular event. For example FIG. 6 shows a method 600 according to an embodiment of the disclosed subject matter for determining a particular event based on received user data. At 610 the method may receive an event profile. The event profile may have a condition of receiving an authorized user data. The method may obtain the authorized user data from the event profile at 620. For example, authorized user data may be a hand gesture biometric data of an authorized user. User data may be collected by sensors such as active infrared sensors or received over a network, such as from a database. At 630, the method may receive a user data from a user, and at 640 compare the received user data to the authorized user data contained in the event profile. If the received user data matches the authorized user data at 650, then at 660 the particular event may be determined to be the event represented by the event profile. For example, the event may be that a child occupant of a premise has returned home after school.

The event profile may also contain a condition of a user data being determined to not be an authorized user data. Thus if user data is collected that does not match authorized user data, then the event profile may be satisfied and it may be determined that an unauthorized user is attempting to access the premises. User data may be any data that may be receive or collected and associated with a user. For example, user data may be a geofence boundary indicator data, a global positioning system location data, a Bluetooth low energy (BLE) signal data, a near field communication (NFC) signal data, a cellular signal data, an online status data, a profile status data, a schedule data, a calendar data, a health monitoring data, a biometric voice, eye, or facial recognition data, an audible user password data, a user image data, or a radiation pattern data reflected from a user.

Figure 7:
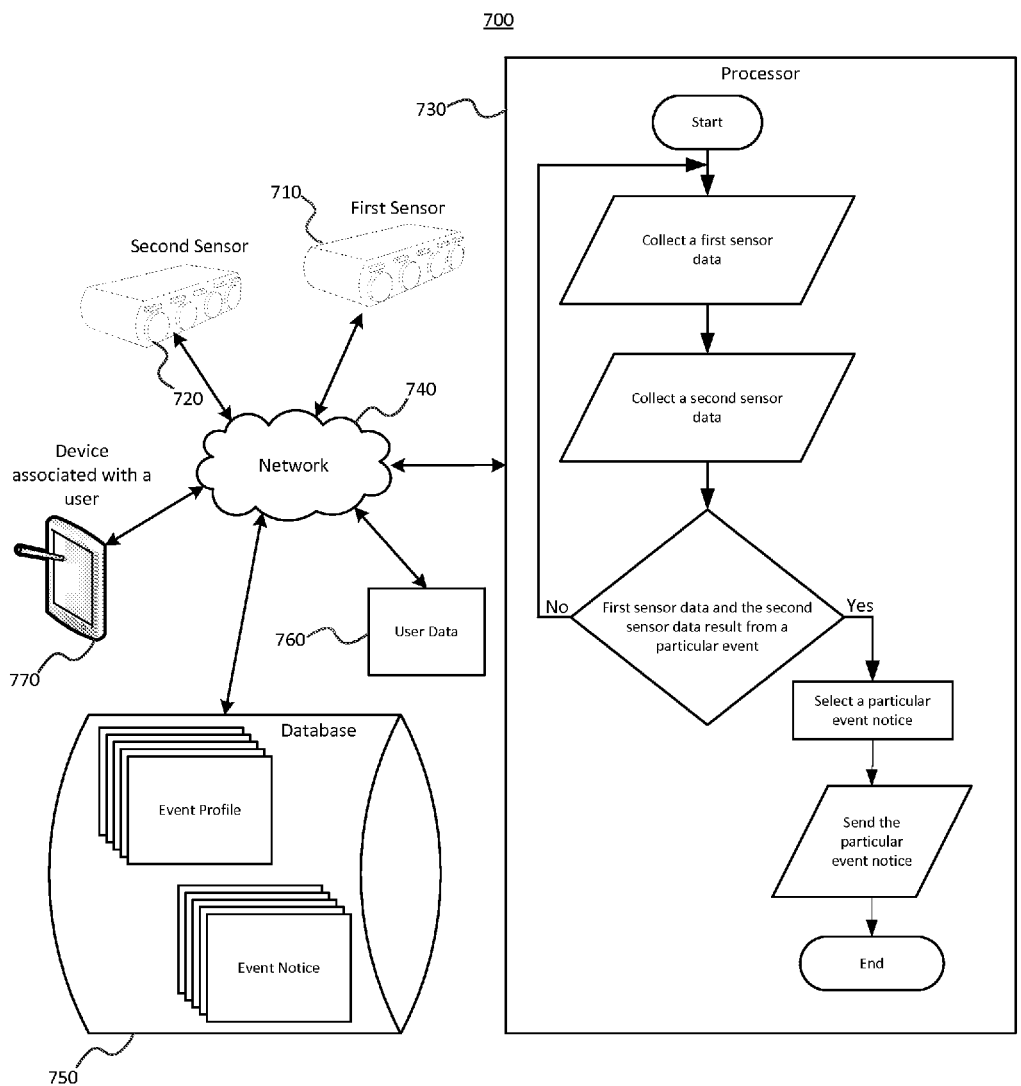
FIG. 7 shows a system according to an embodiment of the disclosed subject matter.

The subject matter of this disclosure may also be embodied in a system. FIG. 7 shows a system 700 according to an embodiment that may determine whether received sensor data results from a particular event. The system may include a first sensor 710, a second sensor 720, and a processor 730 in communication with the first sensor and second sensor, such as over communication network 740. The processor may be configured to execute instructions for the methods set forth in this disclosure. The system may include a database 750 in communication with the first sensor, second sensor, and the processor, and storing event profiles and event notices. The system may include user data 760 and a device associated with a user 770 in communication with other components of the system via the network.

Figure 8:
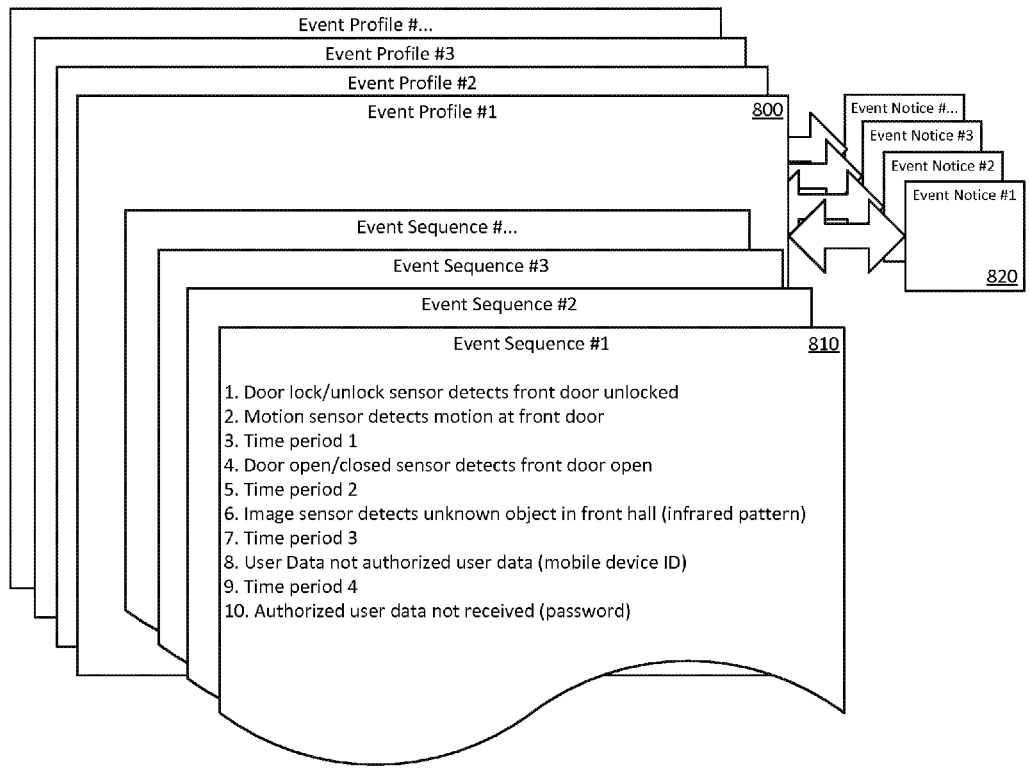
FIG. 8 shows event profiles, event sequences, and event notices according to an embodiment of the disclosed subject matter.

A particular event profile may contain a condition that includes one or more sensor data collection conditions, user data collection conditions, and event sequence conditions, such as those discussed in this disclosure. For example, as shown in event sequence 810 of FIG. 8, an event sequence may be made up of multiple sensor data collections, time periods, and user data collections. Time periods may be independent of the time of day or specify times of day before, during, or after which sensor data or user data may be collected. A time period may be a single time that specifies a time of day after which an event must occur in order to satisfy an event profile condition. For example, an event profile may contain a condition that a door lock/unlock sensor indicate the door is unlocked after 11:00 pm each night. If this condition is met, then a notice may be sent to a device associated with a user indicating the door is unlocked.

An event profile may also contain conditions that a specified percentage of conditions of the event profile are met. For example, an event profile may have a condition that 75% of collected sensor data conditions are satisfied. If 75% of the conditions are met, a particular event may be determined to be the event represented by the event profile. Also an event profile may contain a condition that combinations of conditions occur. For example an event profile may be satisfied either if a certain event sequence is satisfied or if a certain set of sensor data collections occur whether or not in sequence. For example, an event profile representing the event of an occupant arriving at a premises may be satisfied by the sequence of: a door lock/unlock sensor indicates unlocked, the door open/close sensor indicates open, the door open/close sensor indicates closed, the door lock/unlocked sensor indicates locked, and an authorized user's wireless device is recognized at the premises. Or the event profile may be satisfied upon receipt of a user's biometric user data.

Each event profile may comprise an event notice that may indicate the event represented by the event profile to a user or other component of a system, such as a premises monitoring system, smart home environment, or the like. The event notice may also serve other functions such as interfacing with other systems of a premises management system. For example, event profiles 800 are shown in relation to event notices 820, according to an embodiment of the disclosed subject matter.

Figure 9:
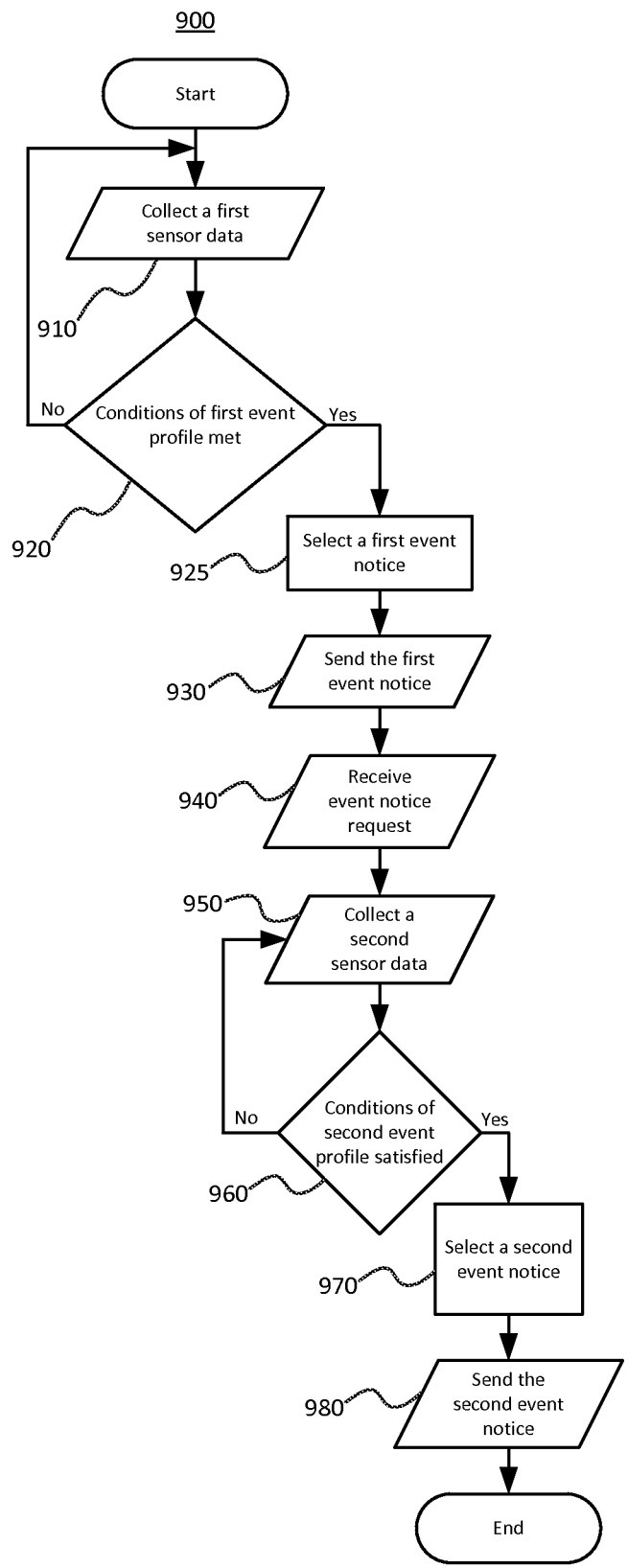
FIG. 9 shows a method according to an embodiment of the disclosed subject matter.

In some circumstances it may be desirable to send an initial notice to a device associated with a user and, in response to a request from the device, send further notices, such as notices including additional data. For example, FIG. 9 shows a method 900, according to an embodiment that may collect a first sensor data at 910 and determine whether the first sensor data is a condition of an event profile at 920. If the first sensor data is determined to be a condition of the event profile, then at 925, the method may send a first event notice. The first event notice may be sent at 930 to a device associated with a user as a simple alert, such as a text message, visual indicator, or a user prompt. The user may then receive the event notice and decide to respond to the prompt or that the notice requires further investigation. The user may then send an event notice request from the device and this request may be received at 940. At 950 the method may collect a second sensor data, and at 960 the method may determine the received event notice request matches a first condition and the second sensor data matches a second condition of a second event profile. Based on this determination, the method may select a second event notice at 970. One or more events that may be represented by event profiles that include multiple sensor data conditions and other data conditions may also be represented by event profiles that include a one or more sensor data conditions and a received event notice request condition. The second event profile may include the second event notice. The second event notice may be triggered by the collection of sensor data that matches a second condition of the second event profile. The second event notice may contain additional data based on the second sensor data. For example, the second event notice may contain images or an audio or video feed collected from the second sensor. The second event notice may be sent to the device at 980 so that the user may monitor the event. The user may also send an end notice request. Upon receipt of the end notice request, the method may stop sending further event notices, such as where the user determines from video data that the unauthorized intruder is a visiting family relative and not an intruder.

In another example, a user may receive an event notice, such as a notice related to the user's premises. The user may be interested in increasing the amount of information available to the user about the premises and may respond by sending an event notice request. Event profiles may include a condition that may be met either by receiving a sensor data, receiving a user data, or receiving an event notice request. For example, an event profile representing the event of a home break-in may include the conditions in a sequence of receiving unauthorized user data three times within a time threshold, receiving an indication the front door is locked, and receiving a front door open indicator. However the front door open indicator condition for this event profile may also be satisfied by receiving an event notice request. Another event profile representing the event of attempted unauthorized access to the home may contain the conditions of receiving unauthorized user data three times within the same time threshold and receiving an indication the front door is locked. Based on satisfying these conditions, a first event notice may be sent to a user indicating attempted unauthorized access. The user may wish to know more about this event and send an event notice request. Upon receipt of the event notice request, the final condition of the home break-in event profile may be met and a second event notice may be sent to the user. This second event notice may be video data from a video sensor that depicts the front door or other notice suitable for indicating the event. In this way the user may observe the events taking place at the front door before the door open sensor data is received. The conditions of multiple event profiles may be satisfied by receiving an event notice request. In this way the user may receive event notices for one or more events of which the user would otherwise be unaware because the other conditions of event profiles representing the events may not otherwise be met.

The methods, systems, and devices set forth in the subject matter of this disclosure may be in communication with other methods, systems, and devices throughout a premises. Combined, these systems, methods, and devices may make up the greater smart home environment for the premises. Additional aspects of the smart home environment and related components are discussed in the following portions of this disclosure.

In general, a "sensor" as disclosed herein may include multiple sensors or sub-sensors, such as a position sensor that includes both a global positioning sensor (GPS) as well as a wireless network sensor. This combination may provide data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 10A:
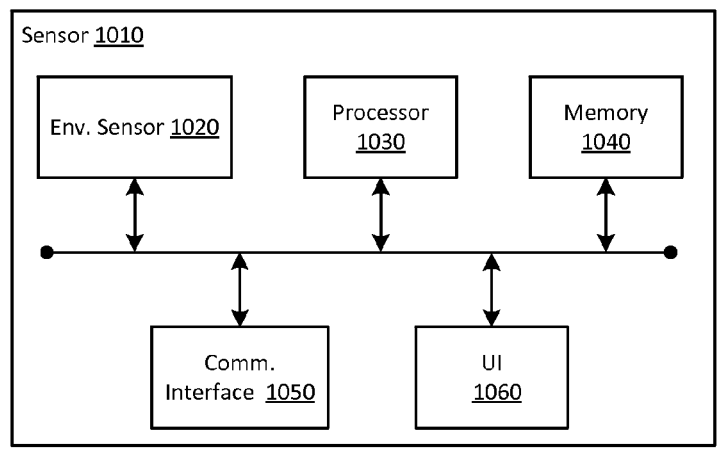
FIG. 10A shows a sensor according to an embodiment of the disclosed subject matter.

A sensor may include hardware in addition to the specific physical sensor that obtains information about the environment. FIG. 10A shows an example sensor as disclosed herein. The sensor 1010 may include an environmental sensor 1020, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 1010 is located. A processor 1030 may receive and analyze data obtained by the sensor 1010, control operation of other components of the sensor 1010, and process communication between the sensor and other devices. The processor 1030 may execute instructions stored on a computer-readable memory 1040. The memory 1040 or another memory in the sensor 1010 may also store environmental data obtained by the sensor 1010. A communication interface 1050, such as a Wi-Fi or other wireless interface, Ethernet or other local network interface, or the like may allow for communication by the sensor 1010 with other devices. A user interface (UI) 1060 may provide information and/or receive input from a user of the sensor. The UI 1060 may include, for example, a speaker to output an audible alarm when an event is detected by the sensor 1060. Alternatively, or in addition, the UI 1060 may include a light to be activated when an event is detected by the sensor 1010. The user interface may be relatively minimal, such as a liquid crystal display (LCD), LED display, or limited-output display, or it may be a full-featured interface such as a touchscreen. Components within the sensor 1010 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Figure 10B:
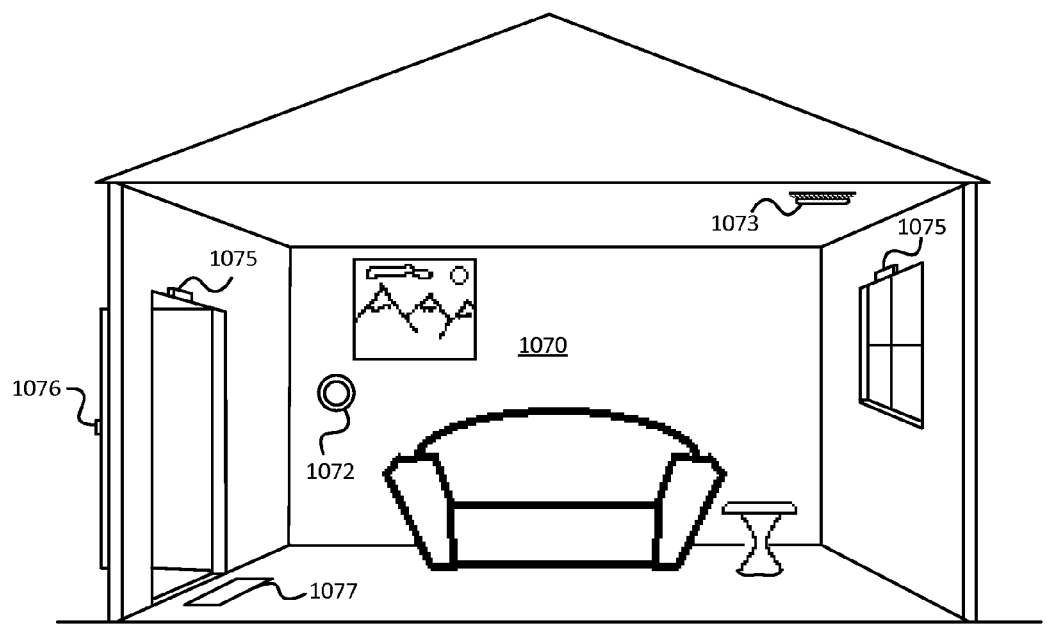
FIG. 10B shows a premises according to an embodiment of the disclosed subject matter.

As an example of the implementation of sensors within a premises FIG. 10B depicts, one or more sensors implemented in a home premises 1070 as part of a smart home environment. The smart home environment may include multiple types of premises management devices, such as one or more intelligent, multi-sensing, network-connected thermostats 1072, one or more intelligent, multi-sensing, network-connected poisonous gas detection units 1073, one or more intelligent, multi-sensing, network-connected entry detection units 1075, one or more intelligent, multi-sensing, network-connected door handles 1076, and one or more intelligent, multi-sensing, network-connected weight sensors 1077.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors, that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Figure 11A:
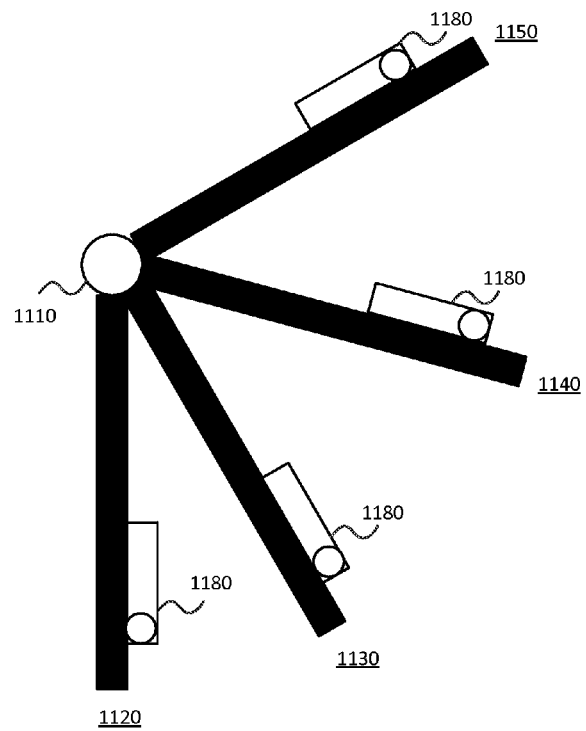
FIG. 11A shows a sensor according to an embodiment of the disclosed subject matter.

As another example, a system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the system is activated, it may interpret such non-detection as the door being ajar or open. In some configurations, a separate sensor or a sensor integrated into one or more of the magnetometer and/or magnet may be incorporated to provide data regarding the status of the door. (A status of a door, physical status, occupancy status, or status of a premises are distinct from a status of a device as described above) For example, an accelerometer and/or a compass may be affixed to the door and indicate the status of the door and/or augment the data provided by the magnetometer. FIG. 11A shows a schematic representation of an example of a door that opens by a hinge mechanism 1110. In the first position 1120, the door is closed and the compass 1180 may indicate a first direction. The door may be opened at a variety of positions as shown 1130, 1140, and 1150. The fourth position 1150 may represent the maximum amount the door can be opened. Based on the compass 1180 readings, the position of the door may be determined and/or distinguished more specifically than merely open or closed. In the second position 1130, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

Figure 11B:
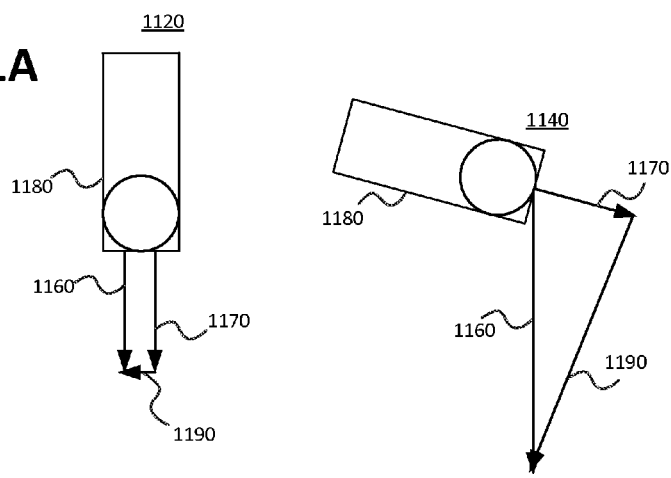
FIG. 11B shows a sensor according to an embodiment of the disclosed subject matter.

FIG. 11B shows a compass 1180 in two different positions, 1120 and 1140, from FIG. 11A. In the first position 1120, the compass detects a first direction 1160. The compass's direction is indicated as 1170 and it may be a known distance from a particular location. For example, when affixed to a door, the compass may automatically determine the distance from the door jamb or a user may input a distance from the door jamb. The distance representing how far away from the door jamb the door is 1160 may be computed by a variety of trigonometric formulas. In the first position 1120, the door is indicated as not being separate from the door jamb (i.e., closed). Although features 1160 and 1170 are shown as distinct in FIG. 11B, they may overlap entirely. In the second position 1140, the distance between the door jamb and the door 1190 may indicate that the door has been opened wide enough that a person may enter. Thus, the sensors may be integrated into a home system, mesh network, or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 1230 and/or remote system 1240 depicted in FIG. 12A. The data may be analyzed to learn a user behavior, an environment state, and/or as a component of a smart home system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, other openings, etc.

The data collected from one or more sensors may be used to determine the physical status and/or occupancy status of a premises. For example, open/close sensors such as door sensors as described with respect to FIGS. 11A and 11B may be used to determine that an unknown person has entered the premises. The system may first determine that a person has entered the premises due to sensors detecting a door opening and closing in a time span previously determined to be consistent with a person entering or leaving the premises. The system next may identify the person as "unknown" due to the absence of a smartphone, key fob, wearable device, or other device typically used to identify occupants of the premises. Continuing the example, sensor data may be received indicating that a valuable item within the premises has been moved, or that a component of the smart home environment associated with security functions such as a controller disclosed herein, has been moved or damaged. Such sensor data may be received, for example, from a sensor attached to or otherwise associated with the valuable item, from the smart home component itself, or from one or more other sensors within the smart home environment. In response, the system may generate an alert indicating that an unknown person has entered the premises and/or that the item or component has been moved or damaged. The system may further determine that an occupant of the home is close by but not present in the premises, for example based upon a Wi-Fi signal received from the occupant's smartphone, but an absence of near-field or other short-range communication from the same smartphone. In this case, the system may be configured to send the alert to the occupant's smartphone, such as via SMS, email, or other communication. As another example, the system may determine that the premises is already in an "away" state and that no occupants are nearby or expected to return in the near future. In this case, the system may be configured to send the alert to a local law enforcement agency, such as via email, SMS, recorded phone call, or the like.

Data generated by one or more sensors may indicate patterns in the behavior of one or more users and/or an environment state over time, and thus may be used to "learn" such characteristics. For example, sequences of patterns of radiation may be collected by a capture component of a device in a room of a premises and used as a basis to learn object characteristics of a user, pets, furniture, plants, and other objects in the room. These object characteristics may make up a room profile of the room and may be used to make determinations about objects detected in the room.

In another example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 pm, and then declines until another approximate time or time period, such as 5:30 pm, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 pm, an occupant is turning on/off a light as the occupant of the room in which the sensor is located enters/leaves the room. At other times, the light sensor data may indicate that no lights are turned on/off in the room. The system, therefore, may learn occupants' patterns of turning on and off lights, and may generate a response to the learned behavior. For example, at 5:30 pm, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Such learning behavior may be implemented in accordance with the techniques disclosed herein. For example, a smart home environment as disclosed herein may be configured to learn appropriate notices to generate or other actions to take in response to a determination that a notice should be generated, and/or appropriate recipients of a particular notice or type of notice. As a specific example, a smart home environment may determine that after a notice has been sent to a first occupant of the smart home premises indicating that a window in a room has been left open, a second occupant is always detected in the room within a threshold time period, and the window is closed shortly thereafter. After making such a determination, in future occurrences the notice may be sent to the second occupant or to both occupants for the purposes of improving the efficacy of the notice. In an embodiment, such "learned" behaviors may be reviewed, overridden, modified, or the like by a user of the system, such as via a computer-provided interface to a smart home environment as disclosed herein.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 12A:
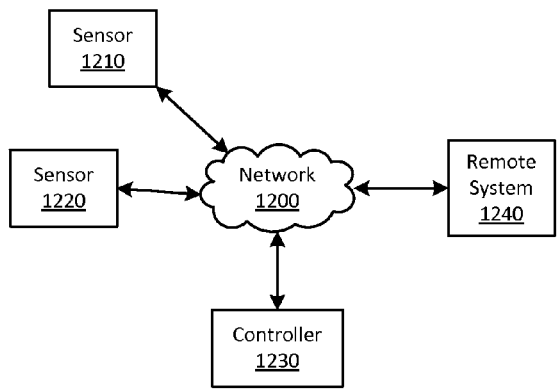
FIG. 12A shows networked sensors according to an embodiment of the disclosed subject matter.

FIG. 12A shows an example of a sensor network as disclosed herein, which may be implemented over any suitable wired and/or wireless communication networks. One or more sensors 1210 and 1220 may communicate via a local network 1200, such as a Wi-Fi or other suitable network, with each other and/or with a controller 1230. The controller may be a general or special-purpose computer. The controller may, for example, receive, aggregate, and/or analyze environmental information received from the sensors 1210 and 1220. The sensors 1210 and 1220 and the controller 1230 may be located locally to one another, such as within a single dwelling, office space, building, room, or the like, or they may be remote from each other, such as where the controller 1230 is implemented in a remote system 1240 such as a cloud-based reporting and/or analysis system. Alternatively or in addition, sensors may communicate directly with a remote system 1240. The remote system 1240 may, for example, aggregate data from multiple locations, provide instruction, software updates, and/or aggregated data to a controller 1230 and/or sensors 1210, 1220.

The devices of the disclosed subject matter may be communicatively connected via the network 1200, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in methods and systems of the disclosed subject matter may avoid communication using a single device. That is, in the mesh-type network, such as network 1200, there is no single point of communication that may fail so as to prohibit devices coupled to the network from communicating with one another.

The communication and network protocols used by the devices communicatively coupled to the network 1200 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 1200, may be easy to set up and secure to use. The network 1200 may use an authentication scheme, such as AES (Advanced Encryption Standard) encryption or the like, to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 1200, which may be a Thread network, may provide security at the network and application layers. One or more devices communicatively coupled to the network 1200 (e.g., controller 1230, remote system 1240, and the like) may store product install codes to ensure only authorized devices can join the network 1200. One or more operations and communications of network 1200 may use cryptography, such as public-key cryptography.

The devices communicatively coupled to the network 1200 of the smart home environment disclosed herein may have low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 1200 may use the power-efficient IEEE 802.15.4 MAC/PHY protocol. In embodiments of the disclosed subject matter, short messaging between devices on the network 1200 may conserve bandwidth and power. The routing protocol of the network 1200 may reduce network overhead and latency. The communication interfaces of the devices coupled to the smart home environment may include wireless system-on-chips to support the low-power, secure, stable, and/or scalable communications network 1200.

The sensor network shown in FIG. 12A may be an example of a smart home environment. The depicted smart home environment may include a structure, a house, office building, garage, mobile home, or the like. The devices of the smart home environment, such as the sensors 1210 and 1220 the controller 1230, and the network 1200 may be integrated into a smart home environment that does not include an entire structure, such as an apartment, condominium, or office space.

The smart home environment can control and/or be coupled to devices outside of the structure. For example, one or more of the sensors 1210 and 1220 may be located outside the structure, for example, at one or more distances from the structure (e.g., sensors 1210 and 1220 may be disposed outside the structure, at points along a land perimeter on which the structure is located, and the like). One or more of the devices in the smart home environment need not physically be within the structure. For example, the controller 1230 which may receive input from the sensors 1210 and 1220 may be located outside of the structure.

The structure of the smart home environment may include a plurality of rooms, separated at least partly from each other via walls. The walls can include interior walls or exterior walls. Each room can further include a floor and a ceiling. Devices of the smart home environment, such as the sensors 1210 and 1220, may be mounted on, integrated with and/or supported by a wall, floor, or ceiling of the structure.

The smart home environment including the sensor network shown in FIG. 12A may include a plurality of devices, including intelligent, multi-sensing, network-connected devices, that can integrate seamlessly with each other and/or with a central server or a cloud-computing system (e.g., controller 1230 and/or remote system 1240) to provide home-security and smart home features. The smart home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 1210 and 1220 shown in FIG. 12A.

For example, a smart thermostat may detect ambient climate characteristics (e.g., temperature and/or humidity) and may accordingly control an HVAC (heating, ventilating, and air conditioning) system of the structure. For example, the ambient climate characteristics may be detected by sensors 1210 and 1220 shown in FIG. 12A, and the controller 1230 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 1210 and 1220 shown in FIG. 12A, and the controller 1230 may control an alarm system to provide a visual and/or audible alarm to the user of the smart home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 1230.

In some embodiments, the smart home environment of the sensor network shown in FIG. 12A may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 1210 and 1220 shown in FIG. 12A. A smart wall switch may detect ambient lighting conditions, and control a power and/or dim state of one or more lights. For example, a sensor such as sensors 1210 and 1220, may detect ambient lighting conditions, and a device such as the controller 1230 may control the power to one or more lights (not shown) in the smart home environment. Smart wall switches may also control a power state or speed of a fan, such as a ceiling fan. For example, sensors 1210 and 1220 may detect the power and/or speed of a fan, and the controller 1230 may adjust the power and/or speed of the fan, accordingly. Smart wall plugs may control supply of power to one or more wall plugs (e.g., such that power is not supplied to the plug if nobody is detected to be within the smart home environment). For example, one of the smart wall plugs may control supply of power to a lamp (not shown).

In embodiments of the disclosed subject matter, a smart home environment may include one or more intelligent, multi-sensing, network-connected entry detectors (e.g., "smart entry detectors"). Such detectors may be or include one or more of the sensors 1210 and 1220 shown in FIG. 12A. The illustrated smart entry detectors (e.g., sensors 1210 and 1220) may be disposed at one or more windows, doors, and other entry points of the smart home environment for detecting when a window, door, or other entry point is opened, broken, breached, and/or compromised. The smart entry detectors may generate a corresponding signal to be provided to the controller 1230 and/or the remote system 1240 when a window or door is opened, closed, breached, and/or compromised. In some embodiments of the disclosed subject matter, the alarm system, which may be included with controller 1230 and/or coupled to the network 1200 may not arm unless all smart entry detectors (e.g., sensors 1210 and 1220) indicate that all doors, windows, entryways, and the like are closed and/or that all smart entry detectors are armed.

The smart home environment of the sensor network shown in FIG. 12A can include one or more intelligent, multi-sensing, network-connected doorknobs (e.g., "smart doorknob"). For example, the sensors 1210 and 1220 may be coupled to a doorknob of a door (e.g., doorknobs located on external doors of the structure of the smart home environment). However, it should be appreciated that smart doorknobs can be provided on external and/or internal doors of the smart home environment.

The smart thermostats, the smart hazard detectors, the smart doorbells, the smart wall switches, the smart wall plugs, the smart entry detectors, the smart doorknobs, the keypads, and other devices of a smart home environment (e.g., as illustrated as sensors 1210 and 1220 of FIG. 12A) can be communicatively coupled to each other via the network 1200, and to the controller 1230 and/or remote system 1240 to provide security, safety, and/or comfort for the smart home environment. Alternatively or in addition, each of the devices of the smart home environment may provide data that can be used to determine an occupancy and/or physical status of a premises, as well as data that may be used to determine an appropriate recipient of a notification, as previously disclosed herein.

A user can interact with one or more of the network-connected smart devices (e.g., via the network 1200). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view, arm or disarm the security system of the home.

One or more users can control one or more of the network-connected smart devices in the smart home environment using a network-connected computer or portable electronic device. In some examples, some or all of the users (e.g., individuals who live in the home) can register their mobile device and/or key FOBs with the smart home environment (e.g., with the controller 1230). Such registration can be made at a central server (e.g., the controller 1230 and/or the remote system 1240) to authenticate the user and/or the electronic device as being associated with the smart home environment, and to provide permission to the user to use the electronic device to control the network-connected smart devices and systems of the smart home environment. A user can use their registered electronic device to remotely control the network-connected smart devices and systems of the smart home environment, such as when the occupant is at work or on vacation. The user may also use their registered electronic device to control the network-connected smart devices when the user is located inside the smart home environment.

Alternatively, or in addition to registering electronic devices, the smart home environment may make inferences about which individuals live in the home (occupants) and are therefore users and which electronic devices are associated with those individuals. As such, the smart home environment may "learn" who is a user (e.g., an authorized user) and permit the electronic devices associated with those individuals to control the network-connected smart devices of the smart home environment (e.g., devices communicatively coupled to the network 1200) in some embodiments, including sensors used by or within the smart home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols. As previously described, such notices may be generated in response to specific determinations of the occupancy and/or physical status of a premises, or they may be sent for other reasons as disclosed herein.

A smart home environment may include communication with devices outside of the smart home environment but within a proximate geographical range of the home. For example, the smart home environment may include an outdoor lighting system (not shown) that communicates information through the communication network 1200 or directly to a central server or cloud-computing system (e.g., controller 1230 and/or remote system 1240) regarding detected movement and/or presence of people, animals, and any other objects and receives back commands for controlling the lighting accordingly.

The controller 1230 and/or remote system 1240 can control the outdoor lighting system based on information received from the other network-connected smart devices in the smart home environment. For example, in the event that any of the network-connected smart devices, such as smart wall plugs located outdoors, detect movement at nighttime, the controller 1230 and/or remote system 1240 can activate the outdoor lighting system and/or other lights in the smart home environment.

Figure 12B:
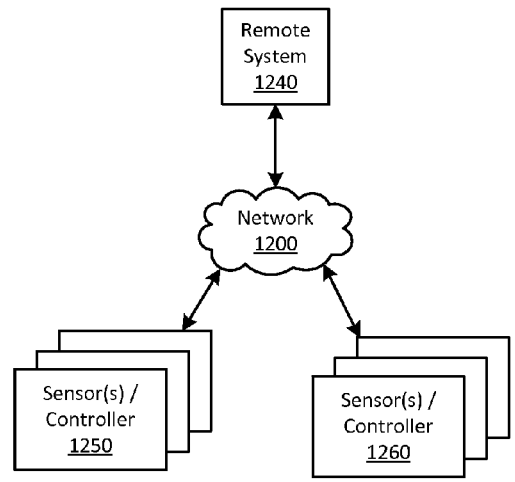
FIG. 12B shows networked sensors according to an embodiment of the disclosed subject matter.

In some configurations, a remote system 1240 may aggregate data from multiple locations, such as multiple buildings, multi-resident buildings, individual residences within a neighborhood, multiple neighborhoods, and the like. In general, multiple sensor/controller systems 1250 and 1260 as shown FIG. 12B may provide information to the remote system 1240. The systems 1250 and 1260 may provide data directly from one or more sensors as previously described, or the data may be aggregated and/or analyzed by local controllers such as the controller 1230, which then communicates with the remote system 1240. The remote system may aggregate and analyze the data from multiple locations, and may provide aggregate results to each location. For example, the remote system 1240 may examine larger regions for common sensor data or trends in sensor data, and provide information on the identified commonality or environmental data trends to each local system 1250 and 1260. Aggregated data may be used to generate appropriate notices and/or determine appropriate recipients for such notices as disclosed herein. For example, the remote system 1240 may determine that the most common user response to a notification that a garage door has been left open while a security component of the smart home environment is in an armed state, is that the user returns to the premises and closes the garage door. Individual smart home systems and/or controllers as previously disclosed may receive such data from the remote system and, in response, set a default action of closing the garage door when the system determines that an armed state has been set and the garage door has been left open for more than a minimum threshold of time. The data provided to the individual systems may be only aggregate data, i.e., such that no individual information about any one other smart home environment or type of smart home environment is provided to any other. As another example, the remote system may receive data from multiple premises in a particular geographic region, indicating that it is raining in the region, and that the rain is moving east (based on the times at which the data indicating rainfall is received from different premises). In response, the remote system may provide an indication to premises further to the east that rain may be expected. In response, notifications may be provided to occupants of the individual premises that rain is expected, that particular windows should be closed, or the like. In some configurations users may be provided with the option of receiving such aggregated data, and/or with the option of providing anonymous data to a remote system for use in such aggregation. In some configurations, aggregated data also may be provided as "historical" data as previously disclosed. Such data may be used by a remote system and/or by individual smart home environments to identify trends, predict physical statuses of a premises, and the like.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 13:
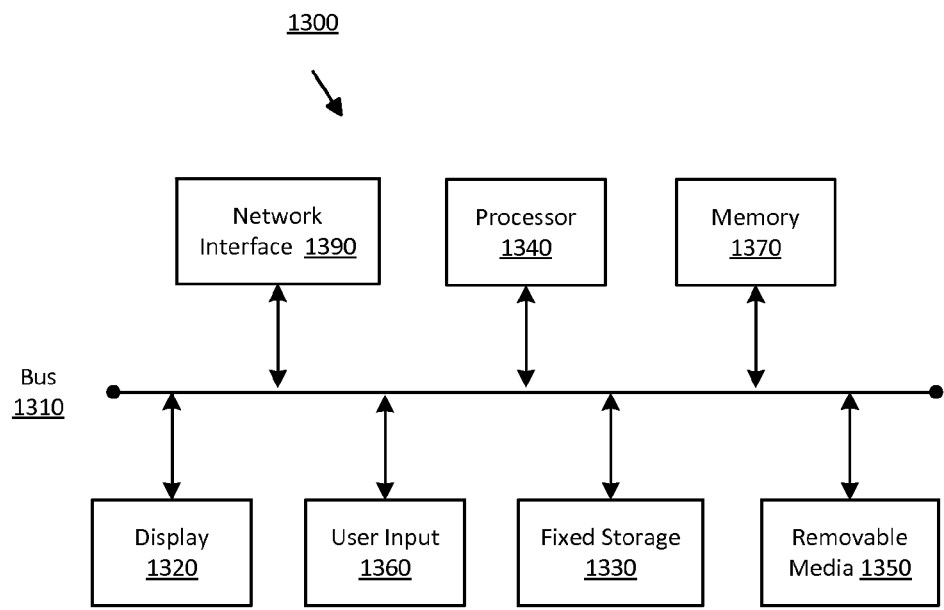
FIG. 13 shows a computing device according to an embodiment of the disclosed subject matter.

Embodiments of the presently disclosed subject matter may be implemented in and used with a variety of computing devices. FIG. 13 is an example of a computing device 1300 suitable for implementing embodiments of the disclosed subject matter. For example, the device 1300 may be used to implement a controller, a device including sensors as disclosed herein, or the like. Alternatively or in addition, the device 1300 may be, for example, a desktop or laptop computer, or a mobile computing device such as a smart phone, tablet, or the like. The device 1300 may include a bus 1310 which interconnects major components of the computer 1300, such as a central processor 1340, a memory 1370 such as Random Access Memory (RAM), Read Only Memory (ROM), flash RAM, or the like, a user display 1320 such as a display screen, a user input interface 1360, which may include one or more controllers and associated user input devices such as a keyboard, mouse, touch screen, and the like, a fixed storage 1330 such as a hard drive, flash storage, and the like, a removable media component 1350 operative to control and receive an optical disk, flash drive, and the like, and a network interface 1390 operable to communicate with one or more remote devices via a suitable network connection.

The bus 1310 allows data communication between the central processor 1340 and one or more memory components 1350 and 1370, which may include RAM, ROM, and other memory, as previously noted. Applications resident with the computer 1300 are generally stored on and accessed via a computer readable storage medium.

The fixed storage 1330 may be integral with the computer 1300 or may be separate and accessed through other interfaces. The network interface 1390 may provide a direct connection to a remote server via a wired or wireless connection. The network interface 1390 may provide such connection using any suitable technique and protocol as will be readily understood by one of skill in the art, including digital cellular telephone, Wi-Fi, Bluetooth®, near-field, and the like. For example, the network interface 1390 may allow the device to communicate with other computers via one or more local, wide-area, or other communication networks, as described in further detail herein.

Figure 14:
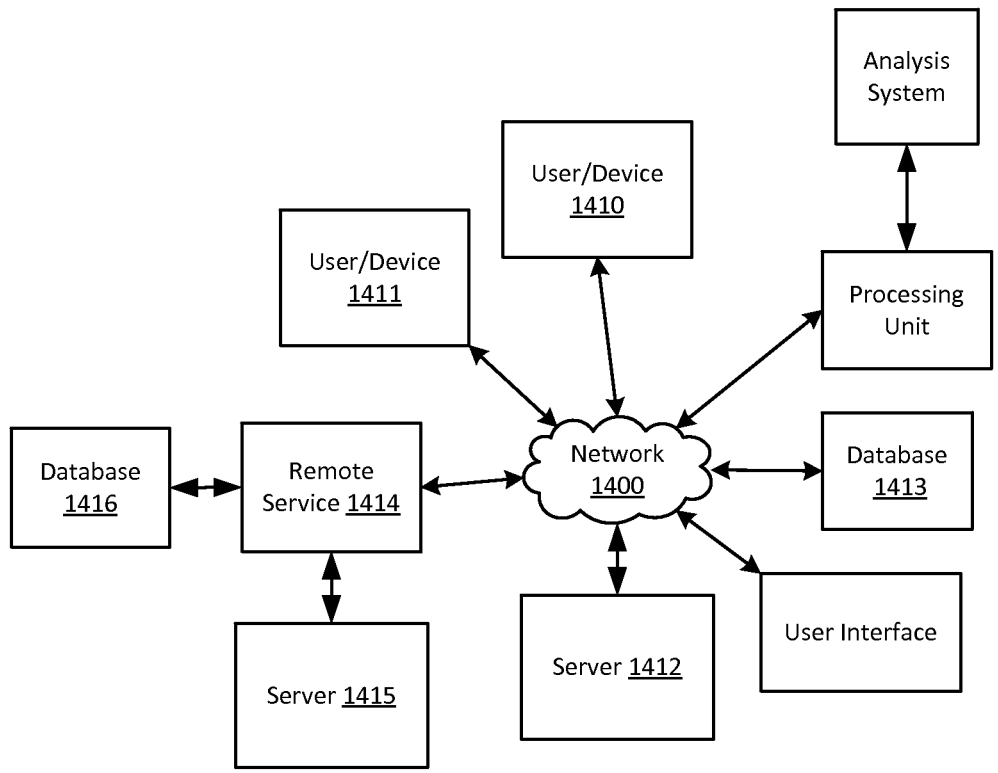
FIG. 14 shows a networked arrangement of devices according to an embodiment of the disclosed subject matter.

FIG. 14 shows an example network arrangement according to an embodiment of the disclosed subject matter. One or more devices 1410 and 1411, such as local computers, smart phones, tablet computing devices, and the like may connect to other devices via one or more networks 1400. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 1412 and/or databases 1413. The remote devices may be directly accessible by the devices 1410 and 1411, or one or more other devices may provide intermediary access such as where a server 1412 provides access to resources stored in a database 1413. The devices 1410 and 1411 also may access remote platforms 1414 or services provided by remote platforms 1414 such as cloud computing arrangements and services. The remote platform 1414 may include one or more servers 1415 and/or databases 1416.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    receiving, in response to a first event, a first sensor data from a first sensor at a first location at a first time;
    receiving, in response to a second event, a second sensor data from a second sensor at a second location at a second time;
    selecting, from among a plurality of event profiles, a first event profile that comprises:
        a plurality of event sequences, wherein at least a first event sequence of the plurality of event sequences comprises a condition matching the first sensor data and at least a second event sequence of the plurality of event sequences comprises a condition matching the first sensor data and a condition matching the second sensor data and
    providing exactly one event notice to a recipient indicated by the first event profile.

2. The method of claim 1, wherein each event profile of the plurality of event profiles comprises:
    a plurality of conditions which, when met, indicate the occurrence of an event defined by the event profile, and
    an event notice to be provided in response to the occurrence of the event.

3. The method of claim 1, wherein the selecting the first event profile further comprises determining that the first location is proximate to the second location to within a location threshold.

4. The method of claim 1, wherein the selecting the first event profile further comprises determining that the first location is the same as the second location.

5. The method of claim 1, wherein the first location corresponds to a first monitored area and the second location corresponds to a second monitored area.

6. The method of claim 1, wherein the first location corresponds to a first monitored area and the second location corresponds to a second monitored area; and
    the selecting the first event profile further comprises determining that the first monitored area overlaps with the second monitored area.

7. The method of claim 1, wherein the selecting the first event profile further comprises determining that the first time is proximate to the second time to within a timing threshold.

8. The method of claim 1, wherein the selecting the first event profile further comprises determining an effect of the first sensor within the second sensor data.

9. The method of claim 1, further comprising emitting, from the first sensor, a radiation pattern;
    detecting the radiation pattern with an imaging component of the second sensor; and
    wherein the selecting the first event profile further comprises determining an effect of the first sensor within the second sensor data.

10. The method of claim 1, wherein the selecting the first event profile further comprises determining an event sequence, the event sequence comprising a receipt of the first sensor data, a receipt of the second sensor data, and a time period between the receipt of the first sensor data and the receipt of the second sensor data.

11. The method of claim 1, further comprising receiving a user data; and
    wherein the selecting the first event profile further comprises determining the received user data is not an authorized user data,
    the authorized user data comprising at least one of the group consisting of: a geofence boundary indicator data, a global positioning system location data, a Bluetooth low energy (BLE) signal data, a near field communication (NFC) signal data, a cellular signal data, an online status data, a profile status data, a schedule data, a calendar data, a health monitoring data, a biometric voice recognition pattern data, and an audible user password data.

12. A system comprising:
    a database storing a plurality of event profiles, each event profile of the plurality of event profiles comprising: a plurality of conditions which, when met, indicate an occurrence of an event defined by the event profile, and an event notice to be provided in response to the occurrence of the event;
    a first sensor;
    a second sensor; and
    a processor, the processor in communication with the database, the first sensor, and the second sensor, and the processor configured to execute instructions for:
        receiving, in response to a first event, a first sensor data from the first sensor at a first location at a first time;
        receiving, in response to a second event, a second sensor data from the second sensor at a second location at a second time;
        selecting, from among the plurality of event profiles, a first event profile that comprises:
            a plurality of event sequences, wherein at least a first event sequence of the plurality of event sequences comprises a condition matching the first sensor data and at least a second event sequence of the plurality of event sequences comprises a condition matching the first sensor data and a condition matching the second sensor data; and providing exactly one event notice to a recipient indicated by the first event profile.

13. The system of claim 12, wherein the processor is further configured to execute instructions for receiving a user data; and the selecting the first event profile further comprises determining:

an event sequence, the event sequence comprising a receipt of the first sensor data, a receipt of the second sensor data, and a time period between the receipt of the first sensor data and the receipt of the second sensor data, and the received user data is not an authorized user data.

14. The system of claim 12, wherein the first sensor comprises a device comprising an active infrared emission component and an image capture component.

15. The system of claim 12, wherein the first sensor comprises at least one selected from the group consisting of: an open/close sensor, a locked/unlocked sensor, a hazard detection sensor, a door knob sensor, a weight sensor, and an entry detector sensor.

16. The system of claim 12, wherein the first sensor comprises the processor.

17. A method comprising:

receiving, in response to a first event, a first sensor data from a first sensor at a first location at a first time;

receiving, in response to the first event, a second sensor data from a second sensor at a second location at a second time;

selecting, from among a plurality of event profiles, a first event profile that comprises:

a first condition matching the first sensor data, and a second condition matching the second sensor data, a plurality of conditions which, when met, indicate an occurrence of the first event, and a first event notice to be provided in response to the occurrence of the first event; and providing the first event notice to a recipient indicated by the event profile;

receiving an event notice request from the recipient;

selecting, from among the plurality of event profiles, a second event profile that comprises:

the first condition matching the first sensor data, the second condition matching the second sensor data, and a third condition matching the received event notice request, a plurality of conditions which, when met, indicate an occurrence of a second event, and a second event notice to be provided in response to the occurrence of the second event; and providing the second event notice to the recipient.

18. The method of claim 17, wherein the third condition is met by receiving a third sensor data or receiving the event notice request from the recipient.

19. The method of claim 17, wherein the third condition is met by receiving a third sensor data or receiving the event notice request from the recipient; and the second event notice, comprises, at least in part, the third sensor data.

20. The method of claim 17, wherein the third condition is met by receiving a third sensor data or receiving the event notice request from the recipient; and the second event notice, comprises, at least in part, data streamed from a sensor.

21. The method of claim 1, further comprising:

determining, based on the first event sequence and the second event sequence, that the first event and the second event are the same third event.

22. The method of claim 21, wherein the exactly one event notice comprises an indication of an occurrence of the third event.

* * * * *